(12) United States Patent
Pearson et al.

(10) Patent No.: US 10,253,984 B2
(45) Date of Patent: Apr. 9, 2019

(54) REFLECTIVE COATING FOR COMPONENTS

(71) Applicant: United Technologies Corporation, Hartford, CT (US)

(72) Inventors: Matthew Robert Pearson, East Hartford, CT (US); Joseph V. Mantese, Ellington, CT (US); Rhonda R. Willigan, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 428 days.

(21) Appl. No.: 14/698,209

(22) Filed: Apr. 28, 2015

(65) Prior Publication Data
US 2016/0320059 A1 Nov. 3, 2016

(51) Int. Cl.
*F23R 3/00* (2006.01)
*C23C 4/04* (2006.01)
(Continued)

(52) U.S. Cl.
CPC .............. *F23R 3/002* (2013.01); *B05D 1/02* (2013.01); *B05D 1/18* (2013.01); *C23C 4/04* (2013.01); *C23C 4/11* (2016.01); *C23C 4/134* (2016.01); *C23C 28/3215* (2013.01); *C23C 28/3455* (2013.01); *C23C 30/00* (2013.01); *F01D 5/284* (2013.01); *F01D 5/288* (2013.01); *F01D 9/041* (2013.01); *F01D 25/08* (2013.01); *F02C 7/24* (2013.01); *F05D 2220/32* (2013.01);
(Continued)

(58) Field of Classification Search
USPC ..... 427/402, 446, 448; 428/195.1, 426, 457, 428/689
See application file for complete search history.

(56) References Cited

U.S. PATENT DOCUMENTS

| 5,484,263 A | 1/1996 | Nagaraj et al. |
| 5,851,679 A | 12/1998 | Stowell et al. |

(Continued)

FOREIGN PATENT DOCUMENTS

| JP | 2003055756 A | 2/2003 |
| WO | WO2009097834 A1 | 8/2009 |

(Continued)

OTHER PUBLICATIONS

WO2014053321_MT. Apr. 10, 2014.*
(Continued)

*Primary Examiner* — Archene A Turner
(74) *Attorney, Agent, or Firm* — Kinney & Lange, P.A.

(57) ABSTRACT

A component includes a substrate formed from a metallic or ceramic material and a thermal barrier coating positioned on the substrate. The component also includes a ceramic reflective coating integral with the thermal barrier coating. The reflective coating includes an arrangement of features configured to reflect at a wavelength at which peak emission from a heat source occurs. A method of making a component includes positioning a thermal barrier coating on the component and determining a wavelength emitted from a heat source. The method of making a component also includes producing an arrangement of features using a metamaterial to form a reflective coating and integrating the reflective coating with the thermal barrier coating.

19 Claims, 9 Drawing Sheets

(51) Int. Cl.

| | |
|---|---|
| C23C 28/00 | (2006.01) |
| C23C 30/00 | (2006.01) |
| C23C 4/11 | (2016.01) |
| C23C 4/134 | (2016.01) |
| B05D 1/02 | (2006.01) |
| B05D 1/18 | (2006.01) |
| F01D 5/28 | (2006.01) |
| F01D 9/04 | (2006.01) |
| F01D 25/08 | (2006.01) |
| F02C 7/24 | (2006.01) |

(52) U.S. Cl.
CPC .. *F05D 2230/312* (2013.01); *F05D 2230/313* (2013.01); *F05D 2230/314* (2013.01); *F05D 2230/90* (2013.01); *F05D 2240/35* (2013.01); *F05D 2260/231* (2013.01); *F05D 2300/13* (2013.01); *F05D 2300/15* (2013.01); *F05D 2300/211* (2013.01); *F05D 2300/2118* (2013.01); *F05D 2300/502* (2013.01); *F05D 2300/504* (2013.01); *F05D 2300/611* (2013.01)

(56) References Cited

U.S. PATENT DOCUMENTS

| | | | |
|---|---|---|---|
| 5,998,003 | A | 12/1999 | Courtright et al. |
| 6,210,791 | B1 | 4/2001 | Skoog et al. |
| 6,652,987 | B2 | 11/2003 | Allen et al. |
| 6,884,460 | B2 | 4/2005 | Ackerman et al. |
| 6,925,811 | B2 | 8/2005 | Justis et al. |
| 7,003,959 | B2 | 2/2006 | Ackermann et al. |
| 7,208,230 | B2 | 4/2007 | Ackerman et al. |
| 7,368,164 | B2 | 5/2008 | Stowell et al. |
| 2005/0153065 | A1 | 7/2005 | Lenkner et al. |
| 2005/0238561 | A1* | 10/2005 | Beier ............ B01J 20/06 423/338 |
| 2006/0134347 | A1* | 6/2006 | Chiruvolu ......... C23C 8/00 427/585 |
| 2006/0263209 | A1 | 11/2006 | Ackerman et al. |
| 2006/0263613 | A1 | 11/2006 | Ackerman et al. |
| 2011/0244216 | A1* | 10/2011 | Meyer ............ C23C 28/322 428/316.6 |
| 2013/0330538 | A1* | 12/2013 | Casu ............. C23C 28/048 428/312.8 |
| 2015/0118441 | A1* | 4/2015 | Shang ............. F01D 5/284 428/141 |

FOREIGN PATENT DOCUMENTS

| | | |
|---|---|---|
| WO | WO12076467 A2 * | 6/2012 |
| WO | WO2014053321 A1 | 4/2014 |

OTHER PUBLICATIONS

Wolfe et. al. Surface and Coatings Technology, 190, 2005, 132-149.*

N. Lallemant, A. Sayre, R. Weber, Evaluation of emissivity correlations for H2O CO2 N2/air mixtures and coupling with solution methods of the radiative transfer equation, Progress in Energy and Combustion Science, vol. 22, Issue 6, 1996, 32 pages.

R. Viskanta, Overview of convection and radiation in high temperature gas flows, International Journal of Engineering Science, vol. 36, Issues 12-14, Sep.-Nov. 1998, 23 pages.

Curt H. Liebert, Emittance and absorptance of the national aeronautics and space administration ceramic thermal barrier coating, Thin Solid Films, vol. 53, Issue 2, Sep. 1, 1978, 32 pages.

Charles M. Spuckler, Effect of an Opaque Reflecting Layer on the Thermal Behavior of a Thermal Barrier Coating, Ceramic Engineering and Science Proceedings, 2007, vol. 28, Issue 3, 12 pages.

Hooi Sing Lee, Roman Kubrin, Robert Zierold, Alexander Yu. Petrov, Kornelius Nielsch, Gerold A. Schneider, and Manfred Eich, Thermal radiation transmission and reflection properties of ceramic 3D photonic crystals, J. Opt. Soc. Am. B 29, 2012, 13 pages.

Kaushik Das, Dimitris C. Lagoudas, John D. Whitcomb, Analysis of nano-porous multi-layer film for thermal radiation barrier coatings, Appl Nanosci, 2011, 16 pages.

Grant A. Umeda, William C. Chueh, Liam Noailles, Sossina M. Haile and Bruce S. Dunn, Inverse opal ceria-zirconia: architectural engineering for heterogeneous catalysis, Energy Environ, 2008, 3 pages.

I. Rodriguez, P. Atienzar, F. Ramiro-Manzano, F. Meseguer, A. Corma, H. Garcia, Photonic crystals for applications in photoelectrochemical processes: Photoelectrochemical solar cells with inverse opal topology, Photonics and Nanostructures—Fundamentals and Applications, vol. 3, Issues 2-3, Dec. 2005, 8 pages.

Pavel N. Dyachenko, Jefferson J. do Rosario, Elisabeth W. Leib, Alexander Yu Petrov, Roman Kubrin, Gerold A. Schneider, Horst Weller, Tobias Vossmeyer, and Manfred Eich, Ceramic Photonic Glass for Broadband Omnidirectional Reflection, ACS Photonics 1(11): 1127-1133 (2014), 32 pages.

J. Manara, M. Arduini-Schuster, H.-J. Ratzer-Scheibe, U. Schulz, Infrared-optical properties and heat transfer coefficients of semitransparent thermal barrier coatings, Surface and Coatings Technology, vol. 203, Issue 8, Jan. 15, 2009, 10 pages.

Arthur H. Lefebvre, Flame radiation in gas turbine combustion chambers, International Journal of Heat and Mass Transfer, vol. 27, Issue 9, Sep. 1984, 18 pages.

Robert Siegel, Charles M. Spuckler, Analysis of thermal radiation effects on temperatures in turbine engine thermal barrier coatings, Materials Science and Engineering: A, vol. 245, Issue 2, May 1, 1998, 10 pages.

R. Viskanta, M.P. Mengüç, Radiation heat transfer in combustion systems, Progress in Energy and Combustion Science, vol. 13, Issue 2, 1987, 64 pages.

Parham Sadooghi, Cyrus Aghanajafi, Thermal analysis for transient radiative cooling of a conducting semitransparent layer of ceramic in high-temperature applications, Infrared Physics & Technology, vol. 47, Issue 3, Jan. 2006, 8 pages.

Imhof A. et. al., "Ordered Macoporous Materials by Emulsion Templating," Departments of Chemical Engineering and Materials, Oct. 3, 1997, pp. 948-951, vol. 389, Nature Publishing Group, United Kingsom.

Kelly Matthew J. et. al., "Thermal Barrier Coatings Design with Increased Reflectivity for High-temperature Turbine Applications," International Journal of Applied Ceramic Technology, Jan. 1, 2006, pp. 81-93, vol. 3, Blackwell Publishing, Malden, MA.

Schroden R. C. et. al., "Optical Properties of Inverse Opal Photonic Crystals," Aug. 1, 2002, pp. 3305-3315, vol. 14, American Chemical Society, United States.

Roman Kubrin et. al., "Stacking of Ceramic Inverse Opals with Different Lattice Constants," Mar. 27, 2012, pp. 2226-2235, vol. 95, Journal of the American Society.

Hooi Sing Lee et. al., "Thermal Radiation Transmission and Reflection Properties of Ceramic 3D Photonic Crystals," Feb. 24, 2012, pp. 450-310, vol. 29, Journal of the Optical Society of America B.

Extended European Search Report for EP Application No. 16162161.0, dated Sep. 19, 2016, 11 Pages.

\* cited by examiner

REFLECTIVE COATING FOR COMPONENTS

BACKGROUND

The present disclosure relates generally to components, such as gas turbine engine components including engine combustion system components like combustor liners, and reflective coatings on such components.

A gas turbine engine typically includes a high-pressure spool, a combustion system, and a low-pressure spool disposed within an engine case to form a generally axial, serial flow path about an engine centerline. The high-pressure spool includes a high-pressure turbine, a high-pressure shaft extending axially forward from the high-pressure turbine, and a high-pressure compressor connected to a forward end of the high-pressure shaft. The low-pressure spool includes a low-pressure turbine disposed downstream of the high-pressure turbine, a low-pressure shaft, typically extending coaxially through the high-pressure shaft, and a low-pressure compressor connected to a forward end of the low-pressure shaft, forward of the high-pressure compressor. The combustion system is disposed between the high-pressure compressor and the high-pressure turbine and receives compressed air from the compressors and fuel provided by a fuel injection system. During the combustion process, compressed air is mixed with the fuel in a combustion chamber. The combustion process produces high-energy gases to produce thrust and turn the high- and low-pressure turbines, driving the compressors to sustain the combustion process.

Combustor systems operating at higher temperatures increase engine efficiency. One method of increasing the operating temperature of the combustor is to increase the overall pressure ratio (OPR) in the compression system. As a result, air is discharged from the compressor at a higher pressure and temperature. The OPR of a typical compression system is between 30 and 45, but increasing the OPR to 60, for example, would increase engine efficiency 3 to 6 points. Increasing the OPR also leads to better heat-to-thrust conversion and a 6-9% increase in thrust-specific fuel consumption. However, a higher OPR in the compression system makes it more difficult to cool the walls of the combustion chamber, placing combustor liner durability at risk.

A typical combustor system generates a flame temperature that exceeds the melting point of the metal that lines the combustion chamber. Current methods of reducing the temperature of combustor liners include backside cooling and thermal barrier coatings (TBCs) on the hot gas path surfaces. A typical backside cooling system uses an outer shell having a series of holes surrounding the combustion chamber liner. The series of holes supplies a flow of compressed air to the backside of the combustion chamber liner, cooling the liner to prevent melting. A typical TBC is formed from a ceramic and designed to have low thermal conductivity. TBCs improve combustor liner durability reducing the heat load into the panel.

Total heat load into the panel can be broken down into radiative and convective heat load. Convective heat is generated by the motion of the combustion gases across the combustor liner. Radiative heat is generated by heat radiating from the flame within the combustion chamber. Current methods to increase liner durability only address the convective portion of the heat load. Further, at a higher OPR, a greater portion of the heat load is from radiative and not convective heat. Typically, TBCs only address the convective portion of the heat load because they are largely transparent to the radiative portion at the wavelength of peak flux.

SUMMARY

A component includes a substrate formed from a metallic or ceramic material and a thermal barrier coating positioned on the substrate. The component also includes a ceramic reflective coating integral with the thermal barrier coating. The reflective coating includes an arrangement of features configured to reflect at a wavelength at which peak emission from a heat source occurs.

A method of making a component includes positioning a thermal barrier coating on the component and determining a wavelength emitted from a heat component. The method of making a component also includes producing an arrangement of features using a metamaterial to form a reflective coating, and integrating the reflective coating with the thermal barrier coating.

DETAILED DESCRIPTION

Figure 1:
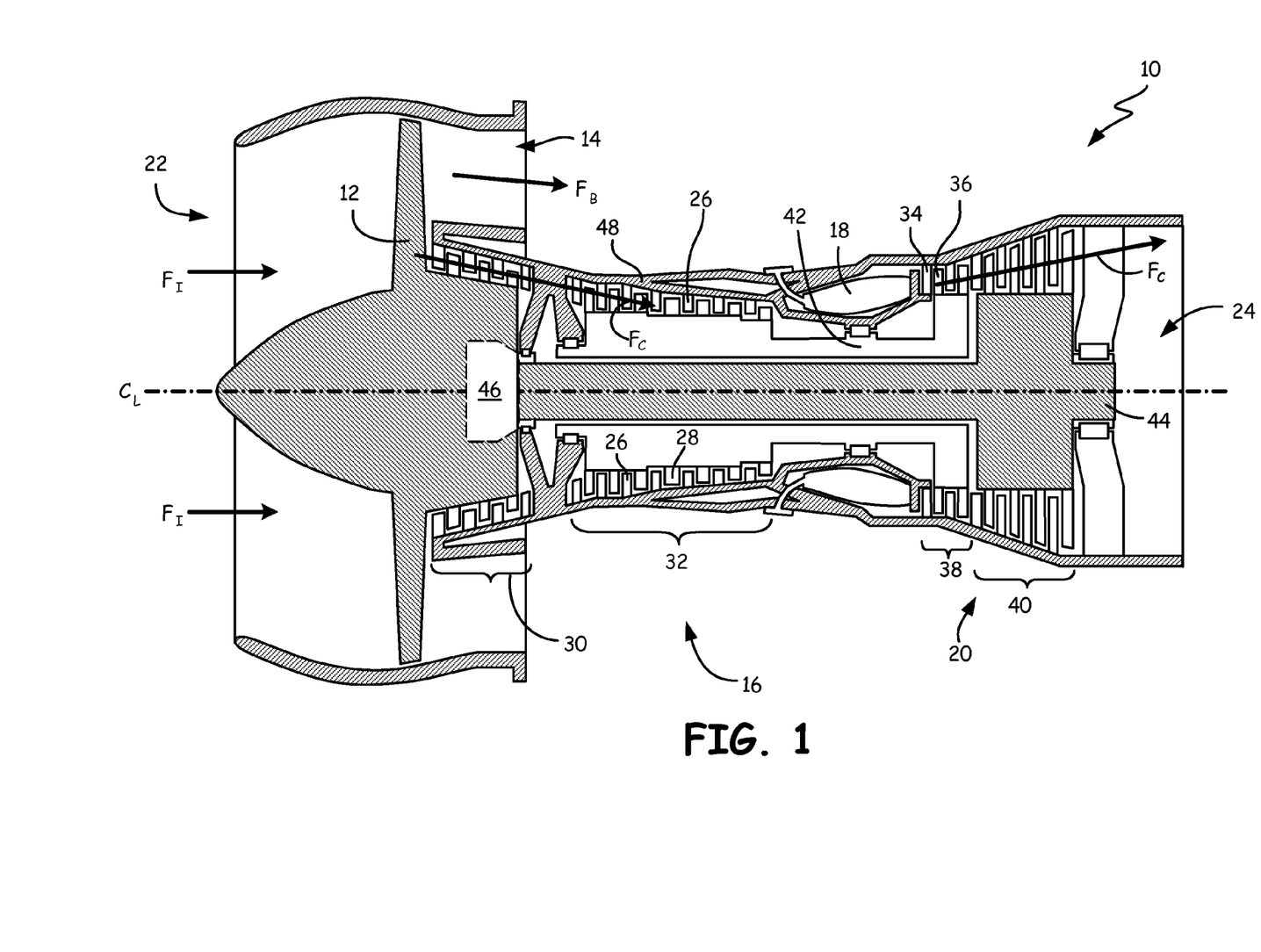
FIG. 1 is a simplified cross-sectional view of a gas turbine engine.

FIG. 1 is a simplified cross-sectional view of a gas turbine engine 10 in accordance with embodiments of the present disclosure. Turbine engine 10 includes fan 12 positioned in bypass duct 14. Turbine engine 10 also includes compressor section 16, combustor (or combustors) 18, and turbine section 20 arranged in a flow series with upstream inlet 22 and downstream exhaust 24. During the operation of turbine engine 10, incoming airflow $F_1$ enters inlet 22 and divides into core flow $F_C$ and bypass flow $F_B$, downstream of fan 12. Core flow $F_C$ continues along the core flowpath through compressor section 16, combustor 18, and turbine section 20, and bypass flow $F_B$ proceeds along the bypass flowpath through bypass duct 14.

Compressor 16 includes stages of compressor vanes 26 and blades 28 arranged in low pressure compressor (LPC) section 30 and high pressure compressor (HPC) section 32. Turbine section 20 includes stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool. LPT section 40 is coupled to LPC section 30 and fan 12 via LPT shaft 44, forming the low pressure spool. HPT shaft 42 and LPT shaft 44 are typically coaxially mounted, with the high and low pressure spools independently rotating about turbine axis (centerline) $C_L$.

In the embodiment of FIG. 1, LPC section 30 and HPC section 32 of compressor 16 compress core flow $F_C$ for combustor 18, where fuel is introduced, mixed with air, and ignited to produce hot combustion gas. In other embodiments, fan 12 can also provide some degree of compression to core flow $F_C$, and LPC section 30 can be omitted. Alternatively, an additional intermediate spool can be included, as in a three-spool turboprop or turbofan configuration.

Combustion gas exits combustor 18 and enters HPT section 38 of turbine 20, encountering turbine vanes 34 and turbines blades 36. Turbine vanes 34 turn and accelerate the flow of combustion gas, and turbine blades 36 generate lift for conversion to rotational energy via HPT shaft 42, driving HPC section 32 of compressor 16. Partially expanded combustion gas flows from HPT section 38 to LPT section 40, driving LPC section 30 and fan 12 via LPT shaft 44. Exhaust flow exits LPT section 40 and turbine engine 10 via exhaust nozzle 24. In this manner, the thermodynamic efficiency of turbine engine 10 is tied to the overall pressure ratio (OPR), as defined between the delivery pressure at inlet 22 and the compressed air pressure entering combustor 18 from compressor section 16. As discussed above, a higher OPR offers increased efficiency and improved performance. It will be appreciated that various other types of turbine engines can be used in accordance with the embodiments of the present disclosure.

Figure 2:
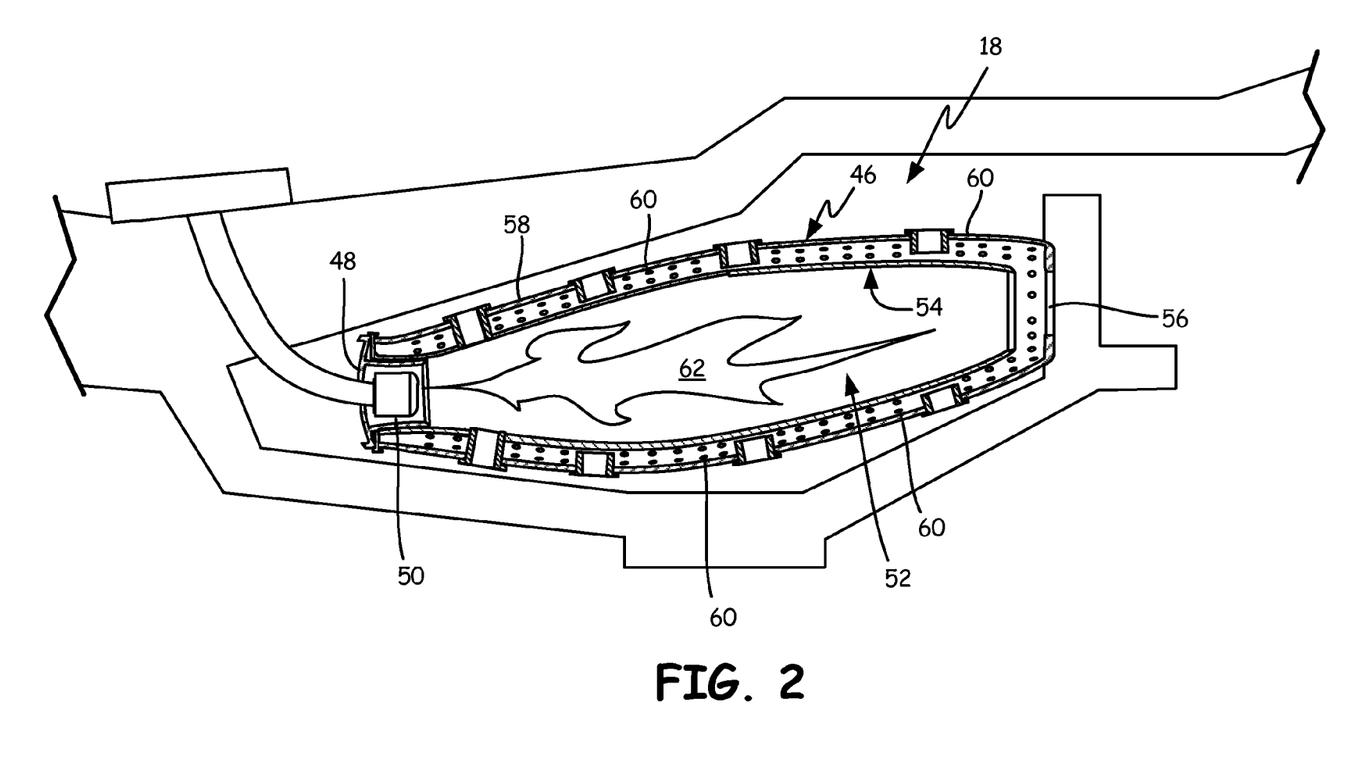
FIG. 2 is a simplified cross-sectional view of a combustor and cooling system.

FIG. 2 is a simplified cross-sectional view of an exemplary combustor 18 and cooling system 46. Combustor 18 includes compressed air inlet 48, fuel injector 50, combustion chamber 52, combustor liner 54, and exhaust 56. Cooling system 46 includes outer shell 58 and impingement holes 60. Compressed air from compressor section 16 enters compressed air inlet 48. Compressed air entering combustion chamber 52 and fuel from fuel injector 50 are ignited to generate combustion reaction 62. Combustion reaction 62 produces combustion gasses that flow along combustion liner 54 and exit combustion chamber 52 through exhaust 56. In this manner, combustor 18 produces high-energy gasses that produce thrust and turn the high- and low-pressure turbines, driving the compressors to sustain the combustion process.

Compressed air directed around the outside of cooling system 46 enters the space between outer shell 58 and combustor liner 54 via impingement holes 60. Compressed air entering impingement holes 60 forms air jets impinging on the backside of combustor liner 54. Because compressed air directed around the outside of cooling system 46 does not react with fuel from fuel injector 50, it has a lower temperature than the combustion gasses within chamber 52. Thus, cooling system 46 cools the backside of combustor liner 54 to improve liner durability during the combustion process.

In the embodiment of FIG. 2, cooling system 46 has a uniform arrangement of impingement holes 60 in outer shell 58. In other embodiments, cooling system 46 can have any number of arrangements of impingement holes 60. Combustor liner 54 can also have a series of effusion holes for directing cooling air into combustion chamber 52 along the surface of combustor liner 54. Air passing though the effusion holes forms a film-cooling layer that reduces the convective heat transfer into the frontside of combustor liner 54. However, combustion reaction 62 also produces radiative heat that radiates onto combustor liner 54, and backside film-cooling methods do little to block radiative heat.

Figure 3:
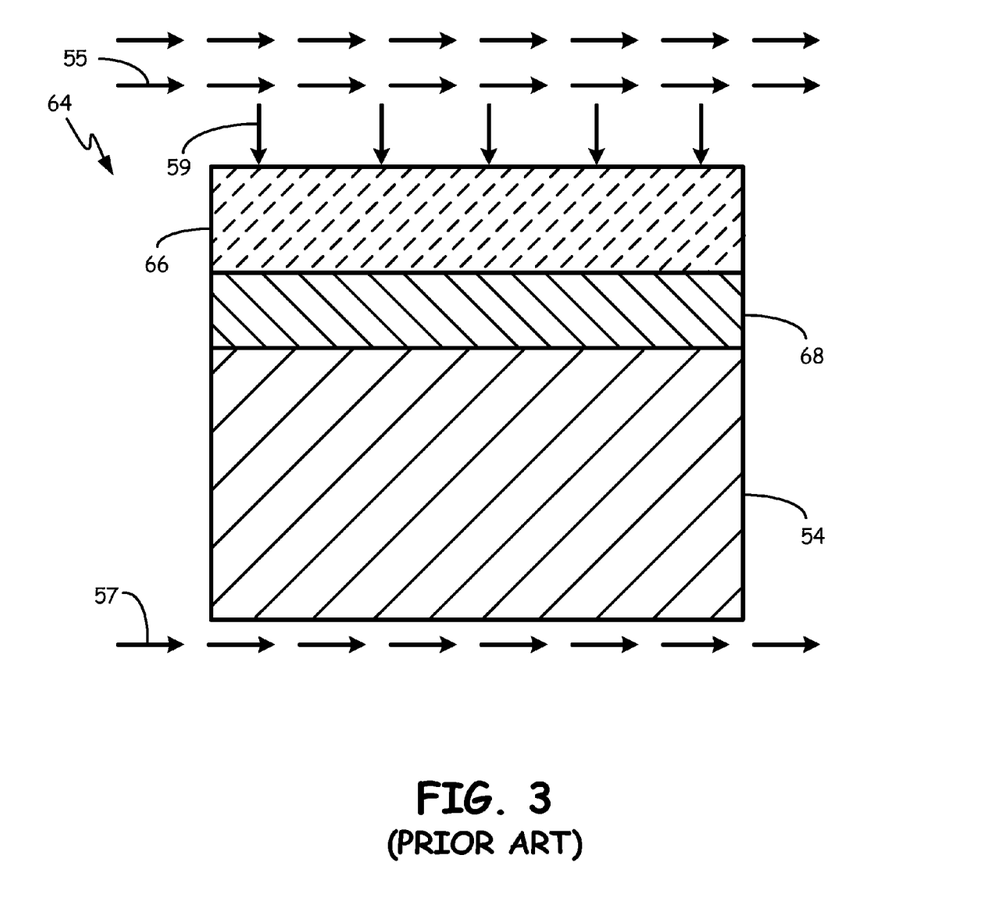
FIG. 3 is a simplified cross-sectional view of a hot section component coating according to the prior art.

FIG. 3 is a simplified cross-sectional view of a hot section component coating according to the prior art. In the embodiment of FIG. 3, the hot section component is combustor liner 54. In other embodiments, the hot section component could be any hot section component such as a blade, vane, nozzle, or duct. The hot section component can be formed from any metallic or non-metallic material subject to extreme temperatures during engine operation. For example, the hot section component can be formed from any nickel-, iron-, or cobalt-based alloy; a monolithic ceramic material such as a zirconia, alumina, magnesia, or silicon nitride ($Si_3N_4$); or a ceramic matrix composition such as carbon/carbon (C/C), silicon carbide/silicon carbide (SiC/SiC), oxide/oxide, or carbon/silicon carbide (C/SiC). A typical coating 64 includes thermal bather coating 66 and bond coat 68. Thermal barrier coating 66 is typically designed to prevent convective heat transfer 55, represented by double horizontal arrows in FIG. 3. Backside air 57 as discussed above with respect to FIG. 2 is represented by single horizontal arrows. Radiative heat 59 is represented by vertical arrows, and prior art methods of reducing radiative heat transfer are included below in the discussion of FIG. 3.

Bond coat 68 is typically applied prior to the application of thermal barrier coating 66. Bond coat 68 can be any material suitable for binding thermal barrier coating 66 to the hot section component. For example, bond coat 68 can be a platinum-aluminide, diffusion aluminide, or MCrAlY-type coating, where M can be cobalt (Co), nickel, (Ni), or a mixture thereof (Co/Ni or Ni/Co). Bond coat 68 can be applied in any suitable manner, such as electrodepositing a layer of platinum, vapor depositing a layer of aluminum over the platinum, and interdiffusing the two layers for a platinum-aluminide coating. A MCrAlY-type coating can be applied by low-pressure plasma spray, air plasma spray, high velocity oxygen flame deposition, or electron beam physical vapor deposition.

Thermal barrier coating 66 is typically a ceramic coating such as yttria-, magnesium-, gadolinia-, or calcium-stabilized zirconia coating. Thermal barrier coating 66 can also include polychlore ($A_2B_2O_7$) compounds, where A is a trivalent cation, and B is a tetravalent cation. Thermal barrier coating 66 can be applied in any suitable manner, such as electron beam physical vapor deposition, air plasma spray, plasma spray, suspension plasma spray, dip coat, paint-on, or print-on methods. Thermal barrier coating 66 can have a depth ranging from 50 μm to 1000 μm.

Thermal barrier coating 66 can include a metallic material layered within thermal barrier coating 66 to give thermal barrier coating 66 reflective properties and reduce radiative heat transfer to the hot section component. In other embodiments, thermal barrier coating 66 has a layer of polished metal deposited directly onto its surface to give thermal barrier coating 66 reflective properties. For example, thermal barrier coating 66 typically includes layers of noble or precious metals or metal alloys such as osmium, rhenium, ruthenium, platinum, platinum alloys, palladium, palladium alloys, rhodium, rhodium alloys, palladium, or palladium alloys. In other embodiments, thermal barrier coating 66 has a layer of polished metal deposited directly onto its surface to give thermal barrier coating 66 reflective properties.

The presence of metal within thermal barrier coating 66 has several disadvantages. For example, the metal and ceramic have different coefficients of thermal expansion, causing thermal barrier coating 66 to spall or crack more quickly. Further, metals are prone to oxidation at extreme temperatures, and initially reflective metal surfaces will eventually lose reflective properties. Thus, thermal barrier coatings of the prior art are less effective as barriers to radiative heat.

Figure 4A:
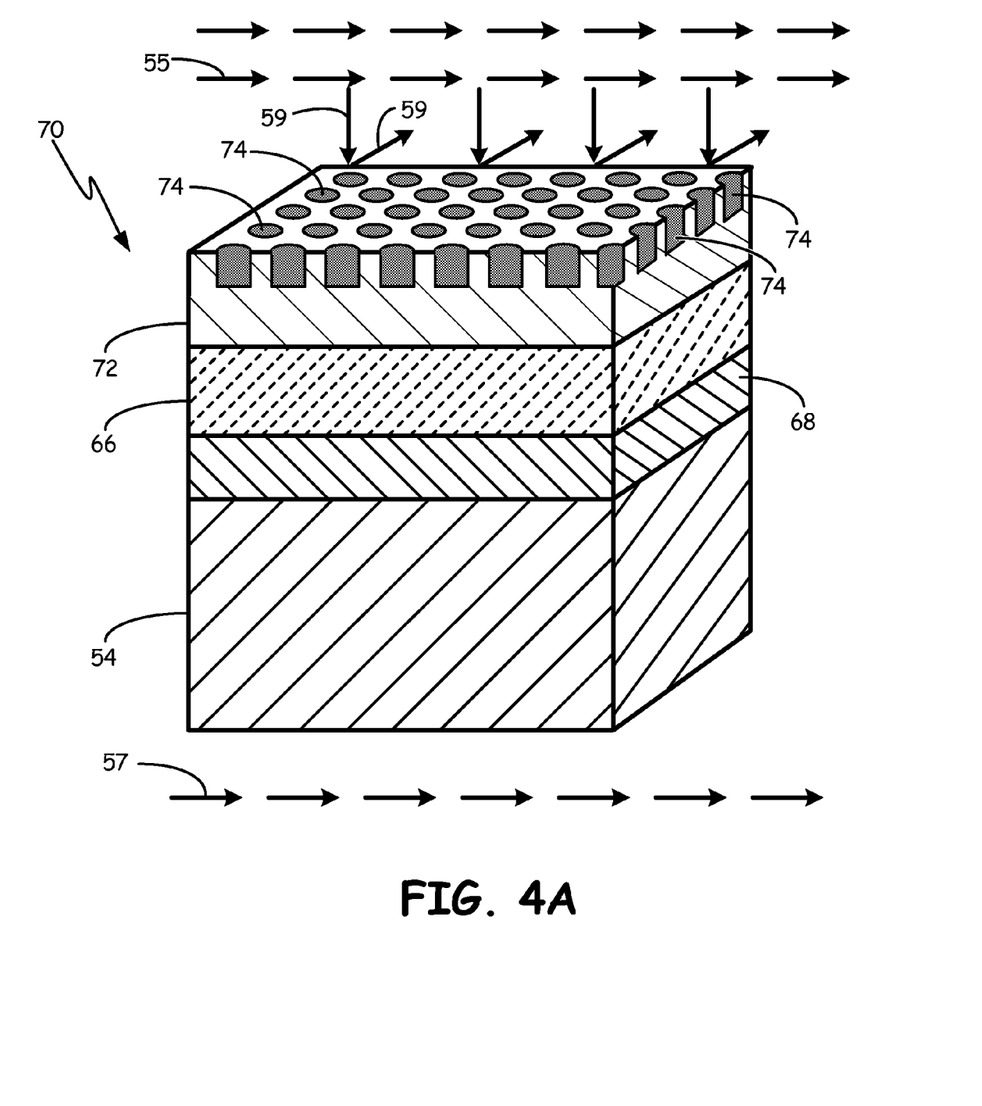
FIG. 4A is a perspective view of a coating for a hot section component according to the present disclosure.

FIG. 4A is a perspective view of a coating for a hot section component according to the present disclosure. In the embodiment of FIGS. 4A-4F, the hot section component is combustor liner 54. In other embodiments, the hot section component could be any hot section component such as a blade, vane, nozzle, or duct. The hot section component can be formed from any metallic or non-metallic material subject to extreme temperatures during engine operation, as discussed above in FIG. 3. In the embodiments of FIGS. 4A-4F, a coating having a reflective means is incorporated with thermal barrier coating 66. In the embodiments of FIGS. 4A-4F, the coating contains features that modify the refractive index of the coating. The features that modify the refractive index can be pores, inclusions, and combinations thereof.

In the embodiment of FIG. 4A, coating 70 includes thermal barrier coating 66, bond coat 68, and reflective coating 72 with inclusions 74. In FIG. 4A and all subsequent figures, hot-side convective heat transfer is represented by double horizontal arrows 55, backside cooling air is represented by single horizontal arrows 57, and hot-side radiative heat is represented by vertical arrows 59. Thermal barrier coating 66 and bond coating 68 can be deposited on combustor liner 54 as described above in the discussion of FIG. 3.

In the embodiment of FIG. 4A, reflective coating 72 can be made from yttria-stabilized zirconia; gadolinium zirconate; yttrium mono- or di-silicate; any form of rare earth zirconate, hafnate, or silicate; or any other stabilized zirconias such as yttrium tantalum stabilized zirconia. In some embodiments, the amount of yttria in yttria-stabilized zirconia may be higher than the amount of yttria in thermal bather coating 66 to maximize the difference in the index of refraction compared to that of inclusions 74. In other embodiments, reflective coating 72 can be made from any material with a similar composition used to make thermal barrier coating 66. In the embodiment of FIG. 4A, reflective coating 72 is layered on top of thermal barrier coating 66. In other embodiments, reflective coating 72 can be layered below thermal barrier coating 66 as shown and described in FIG. 4E, or reflective coating 72 can be layered between separate layers of thermal barrier coating 66 as shown and described in FIG. 4F. Reflective coating 72 can be anywhere from 4 μm to 500 μm thick. The coefficient of thermal expansion (CTE) of reflective coating 72 can be approximately the same as that of thermal barrier coating 66. For example, if the CTE of thermal barrier coating 66 is approximately $10^{-6}$/K, reflective coating 72 can be formed from material having a CTE of approximately $10^{-6}$/K. The thermal conductivity of reflective coating 72 can be approximately the same as that of thermal barrier coating 66. For example, if the thermal conductivity is approximately 1.1-2.3 W/m-K, reflective coating 72 can be formed from a material having a thermal conductivity of approximately 1.1-2.3 W/m-K. The absorption coefficient and the scattering coefficient of reflective coating 72 can be inversely proportional to the absorption coefficient and scattering coefficient of thermal barrier coating 66. For example, if thermal barrier coating 66 has a high absorption coefficient and a low scattering coefficient, reflective coating 72 can have a low absorption coefficient, ideally 0 inverse microns, and a relatively high scattering coefficient, such as 60 inverse microns.

Inclusions 74 comprise a metamaterial configured to maximize the amount of radiative heat reflected by coating 70. A metamaterial is an artificially engineered material that has a periodic microstructure that yields a property not seen in nature. In some embodiments, inclusions 74 can be a ceramic metal oxide or a glass, and can be hollow or solid. In other embodiments, pores can be formed in reflective coating 72. In some embodiments, coating 70 reflects wavelengths between 1 μm and 10 μm. In other embodiments, coating 70 reflects wavelengths between 1 μm and 3 μm, with peak reflectivity at 2 μm. The metamaterial forming inclusions 74 can be a photonic crystal such as an inverse opal. A photonic crystal is a solid material with a periodic array of pores or inclusions that reflect radiation when matched to the wavelength of incident radiation. Inverse opals are inverse replicas of opals. Opals consist of a regular arrangement of uniform spherical particles, while inverse opals consist of a regular arrangement of spherical void spaces surrounded by solid walls.

Figure 4B:
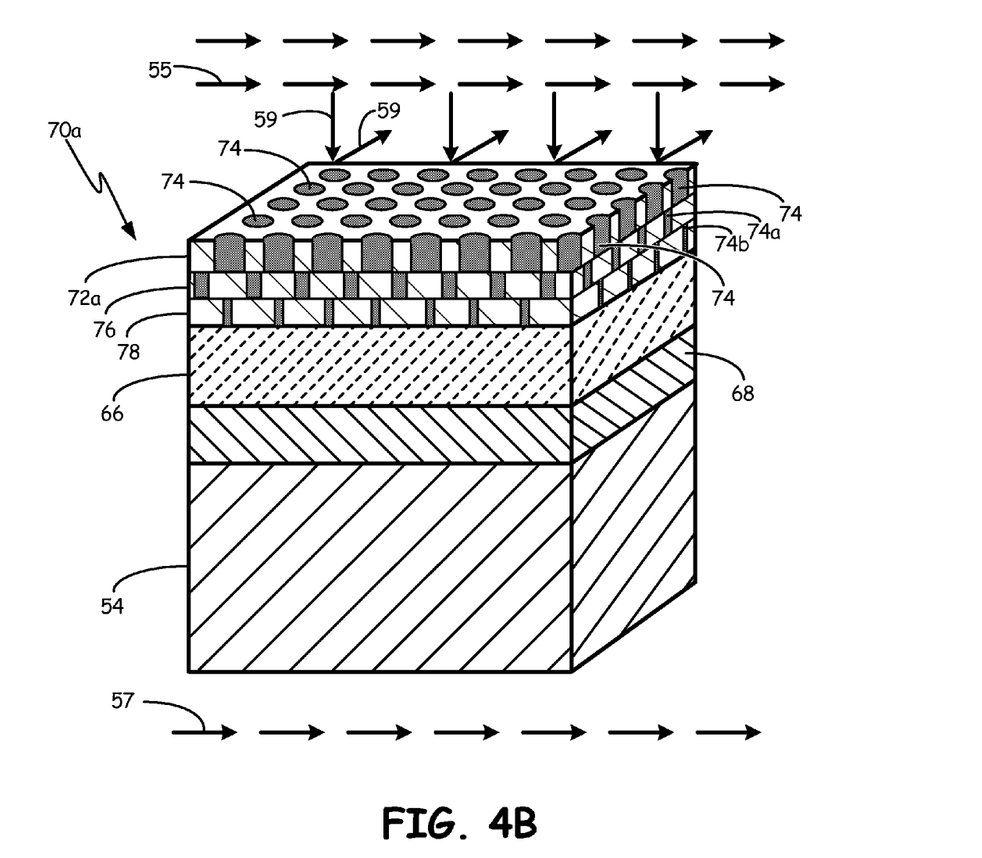
FIG. 4B is a perspective view of a coating for a hot section component according to the present disclosure.
Figure 4C:
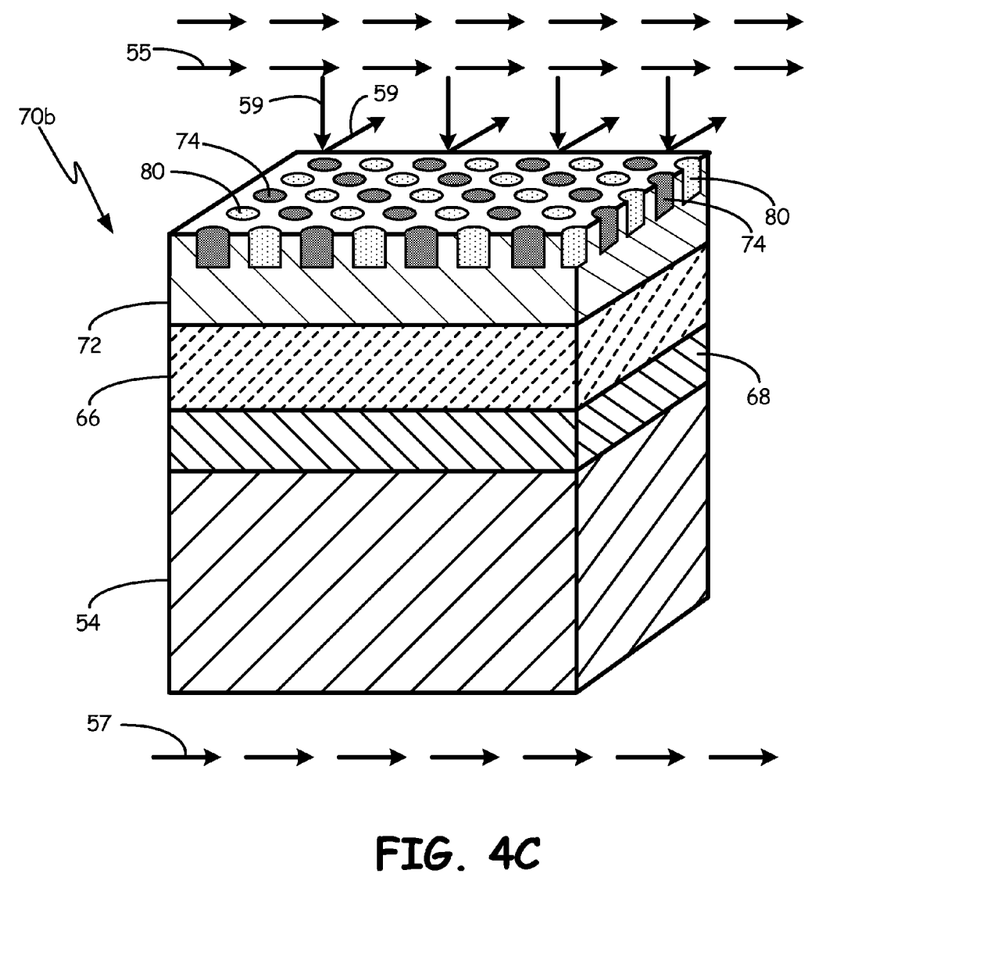
FIG. 4C is a perspective view of a coating for a hot section component according to the present disclosure.
Figure 4D:
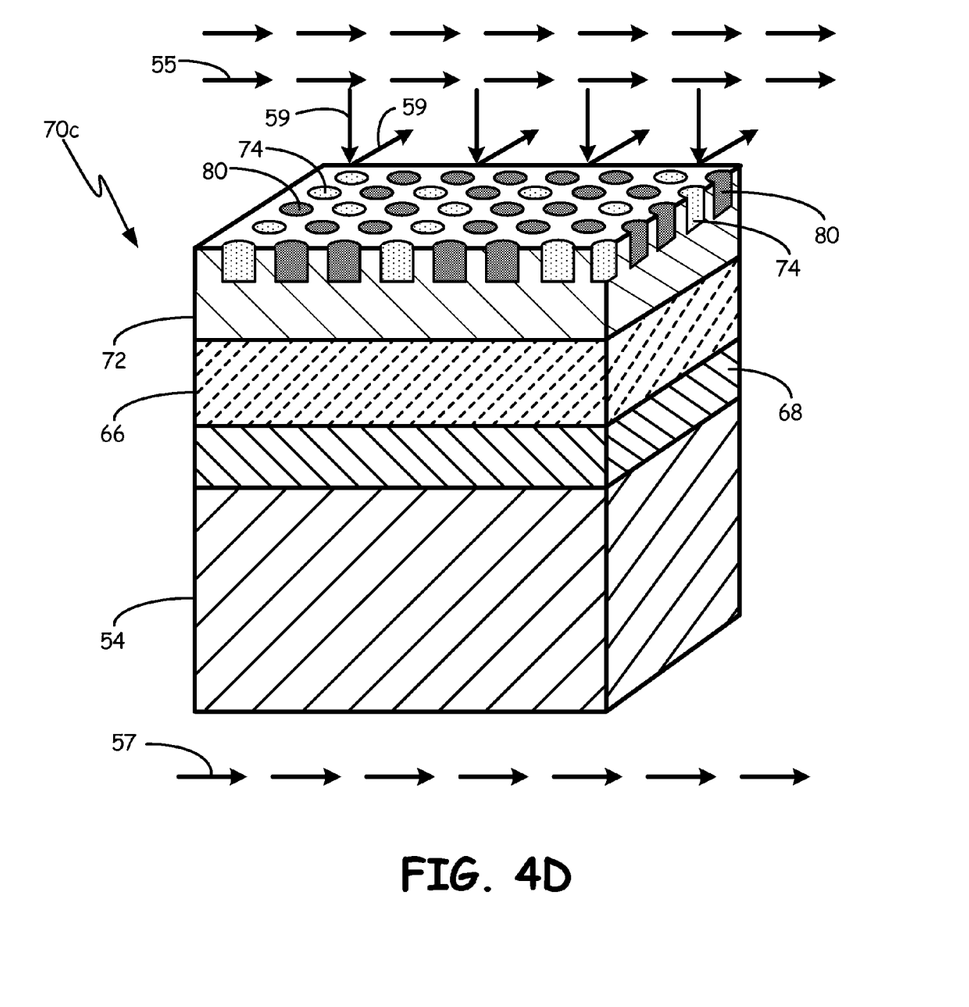
FIG. 4D is a perspective view of a coating for a hot section component according to the present disclosure.

Inclusions 74 can be formed by a single-phase or homogenous material as shown in FIGS. 4A and 4B, or two-phase or heterogeneous material as shown and described in FIGS. 4C and 4D. Inclusions 74 can have a volume fraction, or volume of a substance divided by amount of the substance, of 40-76%. Inclusions 74 can have a diameter between 1 μm and 10 μm, with the wall thickness between inclusions being at least 15.5% the average diameter of the inclusion. The diameter of inclusions 74 can be determined using the Bragg-Snell equation, or $(\lambda_{max})=2d_{111}\sqrt{(\eta^2_{eff}-\sin^2\theta)}$, or more specifically as $(\eta 1*F1+1\eta 2*F2)$ where F1 is the volume fraction of phase 1 and F2 is the volume fraction of phase 2, and $d_{111}=(\frac{2}{3})^{1/2}*D$, where D is the diameter of the pore or inclusion. Thus, by knowing the wavelength at which reflection is at its maximum $(\lambda_{max})$ and the angle of incidence of the heat source, the optimum size of the pores or inclusions can be computed. For example, assuming 35% by volume yttria-stabilized zirconia with an index of refraction of 1.0, a 65% by volume loading of pores with an index of refraction of 1.0, and a combustion flame at 2150° F. (1177° C.) emitting a wavelength of about 2 μm, forming a metamaterial with pores or inclusions having diameters in the range of 885 nm to 1.72 μm would yield very high reflection of the heat incident on the coating. In this manner, the diameter of inclusions 74 can be optimized to reflect wavelengths of a particular size. For example, if a hot section radiation source emits a peak wavelength smaller than 2 μm, the inclusions can have a smaller diameter than that of inclusions reflecting a wavelength of 2 μm. This calculation assumes periodic distribution of pores or inclusions. Inclusions 74 can be formed within reflective coating 72 randomly, or having no particular pattern, or inclusions 74 can have a periodic arrangement.

Reflective coating 72 can be formed by any number of fabrication methods, including dip coat, spray coat, paint, suspension plasma spray (SPS), and direct printing methods. If SPS is used, fabrication of reflective coating 72 can be directly integrated with fabrication of thermal barrier coating 66 by changing the feedstock. Inclusions 74 can be formed by sacrificial templating, in which a fugitive phase, such as polymer microspheres, is burned out to form a photonic crystal. In some embodiments, reflective coating 72 can have a reflectivity as high as 80-90%. In other embodiments, reflective coating 72 can have a reflectivity of at least 50%. Inclusions 74 can withstand multiple hours in a combustion environment (e.g., about 2100° F. (1000° C.) with sulfur, steam, calcium, magnesium, calcium-magnesium alumino-silicate, alkali, $CO_2$, and hydrogen radicals)

and not sinter. Reflective coating 72 can withstand the thermal shock of temperature elevation from room temperature to 1700° F. (927° C.) in 7 seconds and remain intact.

FIG. 4B is a perspective view of coating 70a for a hot section component according to the present disclosure. In the embodiment of FIG. 4B, reflective coating 72a is layered over middle layer 76 and lower layer 78. Middle layer 76 includes inclusions 74a having a smaller diameter than inclusions 74. Lower layer 78 includes inclusions 74b having a smaller diameter than inclusions 74a of middle layer 76. In the embodiment of FIG. 4B, inclusions 74 are formed by a single-phase material. In other embodiments, inclusions 74 can be formed by materials having multiple phases. For example, a single layer in the graded arrangement of FIG. 4B can have inclusions 74 formed from a single-phase material while another layer or layers can have two-phase inclusions. This single phase material comprises a material having uniform properties. In this manner, the refractive index of each layer can vary, with larger inclusions 74 on the top (hot side) of reflective coating 72, and smaller inclusions 74b on the bottom (cold side). Refractive index describes how radiation propagates through a given medium. The reflectivity of a surface is determined by the disparity in refractive index between coating 72a and the inclusions 74, and the angle at which a given wavelength strikes that surface. Thus, layers having inclusions 74 of varying diameters can be used to optimize the reflectivity of coating 70a. In this manner, reflective coating 72 can have a homogenous of graded microstructure with pores or inclusions placed randomly or periodically.

FIGS. 4C and 4D are perspective views of ceramic coating 70b and 70c, respectively, for a hot section component according to the present disclosure. In the embodiments of FIGS. 4C and 4D, inclusions 74 have a different index of refraction from second phase inclusions 80. As described above in FIG. 4A, in some embodiments, inclusions 74 can be a ceramic material. In other embodiments, ceramic coating 70b can have pores modifying the refractive index of ceramic coating 70b in addition to inclusions 74. Second phase inclusions 80 can be any ceramic or oxide having a different index of refraction from inclusions 74. The two-phase arrangement of inclusions 74 and 80 can be at fixed intervals as shown in FIG. 4C, or random as shown in FIG. 4D. In some embodiments, inclusions 74 can be arranged periodically. In other embodiments, inclusions 74 can be positioned randomly in reflective coating 72. Inclusions 74 can be made of one dielectric material having a certain index of refraction, and second phase inclusions 80 can be a second dielectric material having a different index of refraction from the dielectric material forming inclusions 74. For example, inclusions 74 can be borosilicate glass, $TiO_2$, $Al_2O_3$, silica-alumina, or alkali alumino-silicate. Inclusions 74 can be hollow or solid. In this manner, the index of refraction difference in the photonic crystal can be maximized to increase the total reflectivity of reflective coating 72.

Figure 4E:
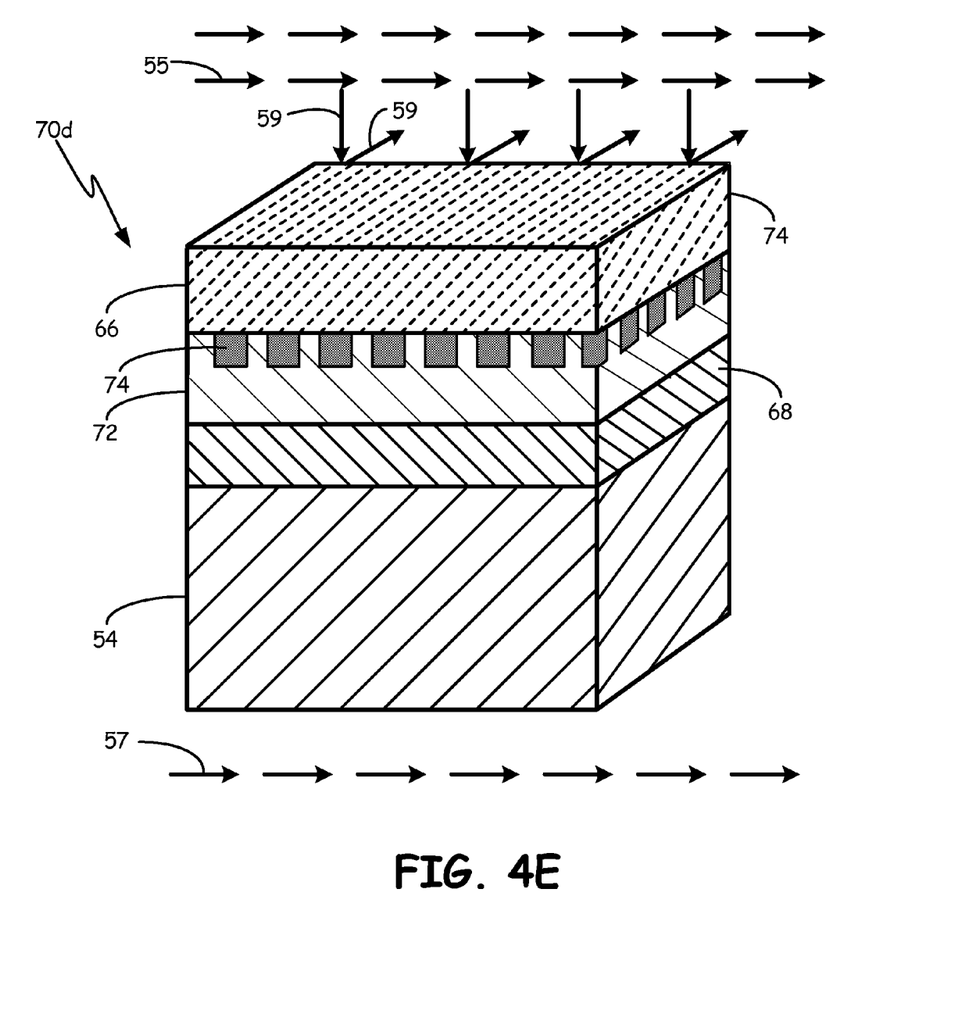
FIG. 4E is a perspective view of a coating for a hot section component according to the present disclosure.
Figure 4F:
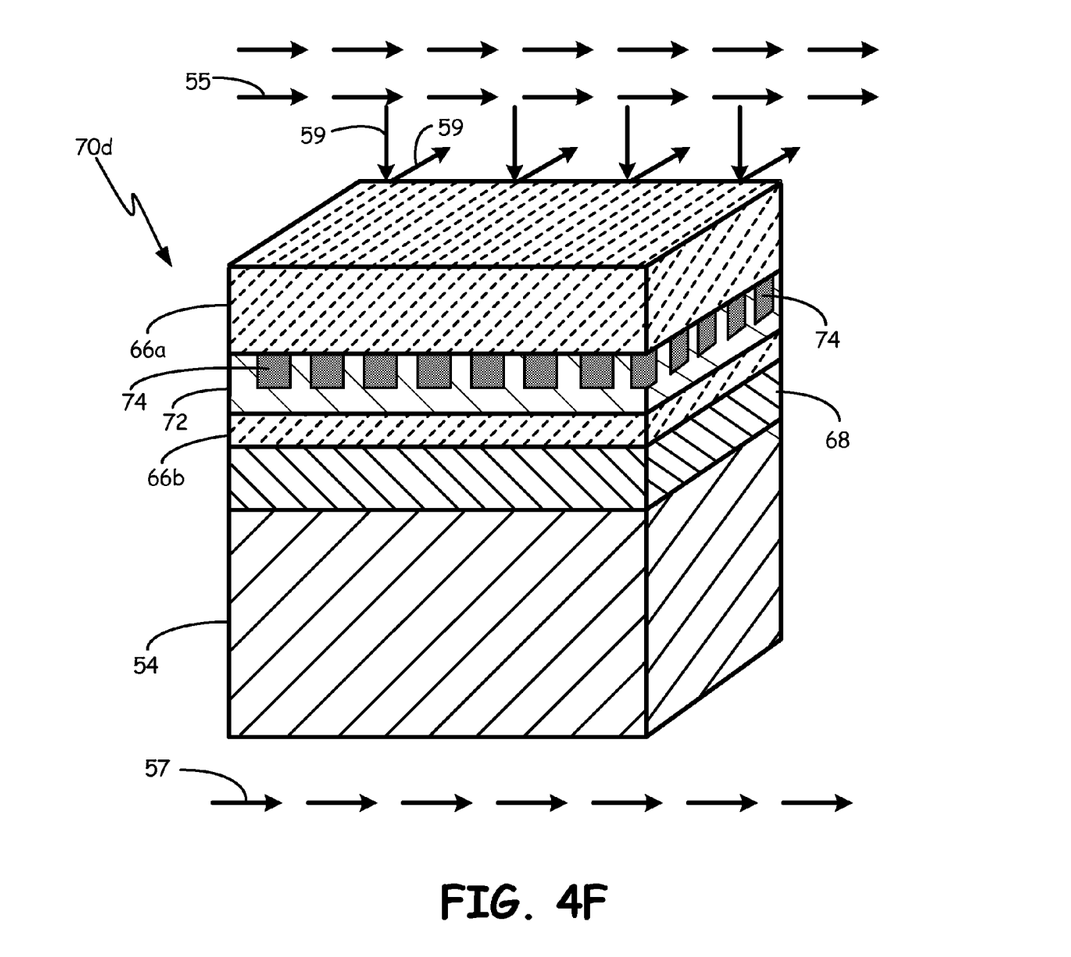
FIG. 4F is a perspective view of a coating for a hot section component according to the present disclosure.

FIGS. 4E and 4F are perspective views of coating 70d and 70e, respectively, for a hot section component according to the present disclosure. The embodiments of FIGS. 4E and 4F can be formed by the materials and methods described above in FIGS. 4A-4D. In the embodiment of FIG. 4E, thermal bather coating 66 is layered on top of reflective coating 72. In the embodiment of FIG. 4F, reflective coating 72 is layered between thermal bather coating 66a and thermal barrier coating 66b. In other embodiments, reflective coating 72 could replace thermal barrier coating 66 if reflective coating 72 serves both the function of a thermal barrier and a reflective coating. The total thickness of thermal barrier coating 66a, reflective coating 72, and thermal barrier coating 66b can be between 250 µm and 500 µm. In this manner, reflective coating 72 can be incorporated into existing hot section components or thermal barrier coating 66 can be formed to incorporate the technology of the present disclosure.

Discussion of Possible Embodiments

The following are non-exclusive descriptions of possible embodiments of the present disclosure.

A component can include a substrate formed from a metallic or ceramic material and a thermal barrier coating positioned on the substrate. The component can also include a ceramic reflective coating integral with the thermal barrier coating. The reflective coating can include an arrangement of features configured to reflect at a wavelength at which peak emission from a heat source occurs.

The component of the preceding paragraph can optionally include, additionally and/or alternatively, any one or more of the following features, configurations and/or additional components:

A further embodiment of the foregoing component can include that the reflective coating is positioned on a side of the thermal barrier coating opposite the substrate.

A further embodiment of any of the foregoing components can include that the thermal barrier coating comprises a plurality of layers, and that the reflective coating is positioned between the plurality of layers of the thermal barrier coating.

A further embodiment of any of the foregoing systems can include that the reflective coating is positioned between the thermal barrier coating and the substrate.

A further embodiment of any of the foregoing components can include that the substrate is selected from the group consisting of a combustor liner, a wall of a combustion chamber, a surface of a turbine vane, and a surface of a turbine blade.

A further embodiment of any of the foregoing components can include that the reflective coating comprises a photonic crystal.

A further embodiment of any of the foregoing components can include that the photonic crystal is an inverse opal.

A further embodiment of any of the foregoing components can include that the reflective coating comprises a first feature and a second feature.

A further embodiment of any of the foregoing components can include that the first feature is a dielectric material and the second feature is a pore.

A further embodiment of any of the foregoing components can include that the first feature is a dielectric material having a first index of refraction and the second feature is a dielectric material having an index of refraction different from the first index of refraction.

A further embodiment of any of the foregoing components can include that the reflective coating is formed from a material selected from the group consisting of stabilized zirconias, gadolinium zirconate, yttrium mono-silicate, yttrium di-silicate, rare-earth zirconates, rare-earth hafnates, rare-earth silicates, and combinations thereof.

A further embodiment of any of the foregoing components can include that the arrangement of features comprises a plurality of features having a feature diameter determined using the Bragg-Snell equation.

A further embodiment of any of the foregoing components can include that the reflective coating comprises a plurality of layers, each layer having a feature of a different diameter, wherein feature diameter decreases as distance from the heat source increases.

A further embodiment of any of the foregoing components can include that the features are inclusions.

A further embodiment of any of the foregoing systems can include that the features are pores.

A further embodiment of any of the foregoing systems can include that the features are a mixture of inclusions and pores.

A method of making a component can include positioning a thermal barrier coating on the component and determining a wavelength emitted from the component. The method of making a component can also include producing an arrangement of features using a metamaterial to form a reflective coating and integrating the reflective coating with the thermal barrier coating.

The method of the preceding paragraph can optionally include, additionally and/or alternatively, any one or more of the following features, configurations and/or additional components:

A further embodiment of the foregoing method can include that determining a wavelength incident upon the component comprises using the Bragg-Snell equation.

A further embodiment of any of the foregoing methods can include that producing an arrangement of features comprises generating an inverse opal by sacrificial templating.

A further embodiment of any of the foregoing methods can include that integrating the reflective coating comprises a fabrication process selected from the group consisting of dip coat, spray coat, paint, suspension plasma spray, direct print, and combinations thereof.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the invention without departing from the essential scope thereof. Therefore, it is intended that the disclosure not be limited to the particular embodiment(s) disclosed, but that the disclosure will include all embodiments falling within the scope of the appended claims.

The invention claimed is:

1. A component for use with a heat source having a peak emission wavelength, the component comprising:
   a substrate formed from a metallic or ceramic material;
   a thermal barrier coating positioned on the substrate;
   a ceramic reflective coating comprising a single layer and formed from a first material and integral with the thermal barrier coating;
   a first inclusion embedded within the reflective coating, the first inclusion comprising a second material different from the first material and having a first index of refraction; and
   a second inclusion embedded within the reflective coating and spaced apart from the first inclusion, the second inclusion comprising a third material different from the first and second materials and having a second index of refraction different from the first index of refraction;
   wherein both the first and second inclusions are situated proximate a top surface of the single layer.

2. The component of claim 1, wherein the reflective coating is positioned on a side of the thermal barrier coating opposite the substrate.

3. The component of claim 1, wherein the thermal barrier coating comprises a plurality of layers, and wherein the reflective coating is positioned between the plurality of layers of the thermal barrier coating.

4. The component of claim 1, wherein the reflective coating is positioned between the thermal barrier coating and the substrate.

5. The component of claim 1, wherein the substrate is selected from the group consisting of a combustor liner, a wall of a combustion chamber, a surface of a turbine vane, and a surface of a turbine blade.

6. The component of claim 1, wherein the reflective coating comprises a photonic crystal.

7. The component of claim 6, wherein the photonic crystal is an inverse opal.

8. The component of claim 1, wherein the first material comprises a material selected from the group consisting of stabilized zirconias, gadolinium zirconate, yttrium monosilicate, yttrium di-silicate, rare-earth zirconates, rare-earth hafnates, rare-earth silicates, and combinations thereof.

9. The component of claim 1, wherein an inclusion diameter of each of the first and second inclusions is determined using the Bragg-Snell equation.

10. The component of claim 1, wherein the first or second inclusion is solid.

11. The component of claim 1, wherein the first or second inclusion is hollow.

12. The component of claim 1, wherein each of the second and third materials comprise a ceramic or glass.

13. A component for use with a heat source having a peak emission wavelength, the component comprising:
    a substrate formed from a metallic or ceramic material;
    a thermal barrier coating positioned on the substrate;
    a ceramic reflective coating comprising a single layer and formed from a first material and integral with the thermal barrier coating:
    an inclusion embedded within the reflective coating, the inclusion comprising a second material different from the first material and having a first index of refraction; and
    a hollow pore embedded within the reflective coating and spaced apart from the inclusion, the pore having a second index of refraction different from the first index of refraction;
    wherein both the inclusion and the hollow pore are situated proximate a top surface of the single layer.

14. The component of claim 13, wherein the inclusion is solid or hollow.

15. The component of claim 13, wherein the second material comprises a ceramic or glass.

16. A method of making a component for use with a heat source having a peak emission wavelength, the method comprising:
    positioning a thermal barrier coating on the component;
    determining the peak emission wavelength incident upon the component;
    forming a single-layer reflective coating from a first material, the reflective coating comprising;
    a first inclusion embedded within the reflective coating, the first inclusion comprising a second material different from the first material having a first index of refraction; and
    a second inclusion embedded within the reflective coating and spaced apart from the first inclusion, the second inclusion comprising a third material different from the first and second materials and having a second index of refraction different from the first index of refraction;

wherein both the first and second inclusions are situated proximate a top surface of the single layer; and integrating the reflective coating with the thermal barrier coating.

17. The method of claim 16, wherein determining the peak emission wavelength incident upon the component comprises using the Bragg-Snell equation.

18. The method of claim 16, wherein producing an arrangement of features comprises generating an inverse opal by sacrificial templating.

19. The method of claim 16, wherein integrating the reflective coating comprises a fabrication process selected from the group consisting of dip coat, spray coat, paint, suspension plasma spray, direct print, and combinations thereof.

* * * * *

UNITED STATES PATENT AND TRADEMARK OFFICE
CERTIFICATE OF CORRECTION

PATENT NO. : 10,253,984 B2
APPLICATION NO. : 14/698209
DATED : April 9, 2019
INVENTOR(S) : Matthew Robert Pearson, Joseph V. Mantese and Rhonda R. Willigan Page 1 of 1

It is certified that error appears in the above-identified patent and that said Letters Patent is hereby corrected as shown below:

In the Specification

Column 4, Line 17:
Delete "bather"
Insert -- barrier --

Column 5, Line 37:
Delete "bather"
Insert -- barrier --

Column 7, Line 62:
Delete "bather"
Insert -- barrier --

Column 7, Line 64:
Delete "bather"
Insert -- barrier --

Signed and Sealed this
Eighteenth Day of June, 2019

Andrei Iancu
*Director of the United States Patent and Trademark Office*